Patented Feb. 27, 1934

1,949,181

UNITED STATES PATENT OFFICE 1,949,181

SEWAGE DISPOSAL

Champlain L. Riley, North Plainfield, N. J., assignor to Industrial Associates, Inc., New York, N. Y., a corporation of New York No Drawing. Application August 26, 1931
Serial No. 559,499

7 Claims. (Cl. 210—2)

This invention relates to the disposal of sewage, and particularly to the conversion thereof into a relatively dry product having a relatively high nitrogen content; a specific feature of this invention being the rapid conversion of the solids of sewage into a burnable product by the use of substantially only the heat derived from the burning of the product to the end that sewage is in accordance with this invention self-consuming.

Heretofore, it has been impossible to de-water sewage rapidly without such expense as to render the operation economically impractical. In the present practice, sewage arriving at the disposal plat is subjected to a coarse straining operation which removes large solids such as rags, sticks, etc. The solids so removed are difficult to dispose of and it has heretofore been the practice to dispose of them by burying in the earth. The residual sewage is then passed into tanks in which it stands for a period varying from two to twenty days in order that bacterial action, which is inherent or is promoted by the addition of sludge from previously digested sewage, may reduce the amount of solids by converting part of the solids into gas, which passes off, or into soluble substances, or by the dissolving of substances which are originally soluble. Thus, a disintegration of the solids takes place, and although the solids may, at least in part, float during some stage of the digesting operation, the residual solids ultimately settle and the liquid is decanted. Thereupon the resulting sludge which usually contains about 10% of solids, but in which the solid content may sometimes be as high as 15% is removed to drying beds, which are frequently glassed over to protect the solids from the weather. In the drying operation, a part of the residual liquid runs off and a part of it evaporates. The resulting product becomes sufficiently dry to be handled with shovels, but it is of little value in that it contains less than 2% of ammonia and its heat of combustion is low. The product so produced contains about 75% to 85% of moisture by weight, and yields about 50% by dry weight of ash when burned, indicating that the bacterial action in the digestion operation and the drying operation have reduced the nitrogen content and the content of combustible materials to a low value. Ordinarily this product is merely buried but in any event it is of such little value that those willing to attempt to utilize it as fertilizer will pay nothing for it even though they are willing to carry it away.

A modification of the present practice heretofore described, is that the green or raw sewage is blown with air after the addition of some previously ripened sewage for the purpose of promoting bacterial action. The result is that the solids are broken up and the product is a sludge in which the solids are in colloidal suspension and will not settle or dry.

In the treatment of sewage in accordance with the prior practice above described, the delays necessary for the procedure of the bacterial action are unavoidable in that the purpose of the bacterial action is to convert solids into water-soluble substances and thereby reduce so far as possible the quantity of residual solids removed from the filter beds, and in order that the separation of the sludge from the liquid can be effected, and in order that the sludge may be capable of being dried in beds, as sludge which has not been subject to substantial bacterial action cannot be so dried.

I have found that if a sludge is immediately separated from raw or green sewage, that sludge can be brought rapidly to a sufficiently dry state for use as fertilizer or as fuel by dispersing it, preferably centrifugally, and subjecting the dispersed particles to the drying action of heated gas, particularly by the use of the process and apparatus described in my Patent No. 1,624,847 and the patent of Arthur B. Jones, No. 1,624,739; and the resulting product will have a relatively high nitrogen content, e. g., up to 6% by weight of ammonia, and will possess such heat of combustion, up to about 8,000 B. t. u. per pound, that combustion of a given amount thereof will supply substantially all heat that is necessary to effect the drying of a sufficient amount of the concentrated sludge in the centrifugal drying operation to produce an equal amount of dried solids.

Procedure in this manner involves a substantially complete abandonment of dependence upon bacterial action and accordingly a substantially complete elimination of the results of bacterial action such as the reduction of ammonia content and the raising of the ash content, and the consequent decreasing of content of combustible material. The moisture content of the final product of the procedure contemplated in this invention can be controlled by adjustment of the drying operation but is preferably such as to prevent the carrying away of solids as dust in the hot circulated drying-gas. Thus, the residual moisture is preferably not less than 20% but is preferably not more than 40% of the dry weight of the solids in the dried product. An important characteristic of the dried product of procedure in accordance with this invention is that its ash content is in the neighborhood of 30% by weight of the dried product. Inasmuch as the dried product of procedure in accordance with this invention contains not substantially more, and usually less, moisture than the product of drying beds above referred to, the low ash content indicates that the elimination or limitation of bacterial action has left in the sludge and in the dried product a much greater proportion of combustible material and a greater content of combined nitrogen than is present in the product of the drying beds or the product of the filtering operation above referred to. Moreover, procedure in accordance with this invention is not subject to the delays and uncertainties necessary in operations like the present practice above described in which substantial delays are indispensible.

In the practice of this invention the reduction made in prior practice, of the final quantity of solids is abandoned as unnecessary and undesirable, and there is thereby imparted to the final solids increased fuel and fertilizer values, and the delays and uncertainties of bacterial action are eliminated.

Moreover, an important feature of this invention is that the drying of the sludge which in its raw state is unfilterable and incapable of being dried in drying beds and previously had to be effected by bacterial treatment in conjunction with drying beds or air blowing and filtering, has been found to be possible by dispersing the unfilterable sludge, the dispersion preferably being effected centrifugally in a manner in which lumps of various size and consistency and composition can be dispersed, and then effecting the drying by subjecting the dispersed particles to the action of heated gas.

Another important feature of this invention is that by abandoning former procedure and producing a dried product which is high in combustible solids and possesses a high heat of combustion, the combustion of that dried product produces sufficient heat to effect the drying necessary to bring the solids to a state in which they are burnable in available furnaces such as those using powdered coal. Thus, in accordance with this invention sewage disposes of itself. There may be and preferably is the same preliminary removal of large solids by coarse straining and it is a feature of this invention that those solids may be ground to a paste and added to the sludge before drying so that it is dried with the sludge and forms an integral part of the ultimate product, thereby disposing of the large solids and utilizing the entire heat value of the solids contained in the raw sewage.

As a specific example of the treatment of sewage in accordance with this invention, to which I do not intend to be bound, inasmuch as this example is described merely as an illustrative application of my invention, sewage containing 0.02% by weight of solids is first subjected to coarse straining and then to gravity settling in a continuously operating settling tank or settling tanks such as those made by the Dorr Co. having a slow-moving rake for the removal of solids, and in that operation, which may or may not be preceded by a brief preliminary concentration of sludge by sedimentation, there is produced a sludge having 10% to 15% of solids. This concentrating operation is relatively brief and involves not more than a day or two depending upon the length of time in which the sewage may have been standing in the pipe system. The sludge recovered from this concentrating operation is then sprayed by the centrifugal atomizer described in the above mentioned patents into a circulating stream of hot gases and in spite of the variations in the size and consistency of the lumps of solids, the solids are dispersed, together with the moisture associated therewith, as a nebula or mist with the current of heated gas, and the solids fall to the bottom of the drying chamber in which they are dispersed, in a sufficiently dried state that they may be used as fertilizer or as fuel. The dried solids may be continuously removed from the drying chamber in any suitable manner. The moisture is carried away in vapor form with the gas, which may be used to preheat the concentrate before it is brought into contact with the rotating wheel of the spray dryer. If used as fuel the heat derived therefrom is sufficient to effect the drying of subsequently dispersed solids in a continuous operation, additional fuel being either unnecessary or small in quantity in most cases. The amount of moisture in the product withdrawn from the centrifugal drying operation is readily controlled by adjusting the temperature and volume of the gas passing into contact with the dispersed solids and liquid, the ultimate moisture percentage preferably being as above stated. As above stated, the solids removed by the preliminary coarse straining operation may, after some mechanical disintegration for converting them into smaller particles be added to the sludge and dried with it, thus becoming an integral part of the ultimate product.

From the foregoing, it will be apparent that I have provided a solution for the problem, believed to be heretofore unsolved, of rapidly disposing completely of sewage, or converting it into fertilizer of substantial value. It will also be apparent that the causing of sewage to dispose of itself in accordance with this invention is facilitated by abandoning reliance upon bacterial action and thereby saving time and avoiding difficulties and ensuring the production of solids having sufficient heat value to enable the combustion thereof to effect the drying in a continuous operation.

My invention is not, however, limited to raw sewage sludge but may be used to advantage also in disposal plants in which digested sludge is produced. The digested sludge which is already sufficiently concentrated is delivered to the centrifugal atomizer disclosed in the aforementioned Riley and Jones patents and the solids are dispersed, together with moisture associated therewith as a nebula or mist and a current of heated gas is contacted with the dispersed solids and liquids and the solids fall to the bottom of the drying chamber in which they are dispersed in sufficiently dried state that they may be used as fertilizer or as fuel for supplying the gas stream used in the spray drying operation. The digesting operation is accompanied by emanation of gas from the sludge, which gas is combustible. This gas is used either as fuel for a gas engine to supply power to circulate the stream of hot gases and drive the centrifugal atomizer or as fuel to supply heat for the drying operation or to preheat the concentrate. Thus the process is self-supporting in that the products resulting from the sludge are utilized to furnish the heat and power required in connection with performing the steps of the process. This invention contemplates the concentration by screening and other methods as well as by gravity settling or sedimentation. Where concentration is effected by screening the concentrate contains large solids and the sludge before spray drying is reduced to a paste by means of a ball mill or other suitable means.

I claim:

1. The method of sewage disposal which comprises concentrating the sewage to form sludge and centrifugally atomizing the sludge in a current of hot gases, thereby converting the sludge into substantially dry comminuted solids of uniform moisture content.

2. The method of sewage disposal which comprises removing large solids by straining, concentrating the strained sewage to form sludge, reducing the solids to a paste and adding the same to the sludge and centrifugally atomizing the sludge in a current of hot gases, thereby converting the sludge into substantially dry comminuted solids of uniform moisture content.

3. The method of sewage disposal comprising rapidly concentrating the solids in the sewage at such rate as to avoid substantial bacterial action, and centrifugally spraying the resulting sludge in contact with heated gas, thereby converting said sludge into substantially dry comminuted solids of uniform moisture content.

4. The method of sewage disposal comprising rapidly concentrating the solids in the sewage at such rate as to avoid substantial bacterial action, introducing the resulting sludge promptly to the influence of centrifugal force and releasing it therefrom and thereby dispersing the solids and liquid of the sludge into fine particles, and contacting heated gas with the finely divided particles resulting from the dispersing operation and thereby converting the sludge into substantially dry comminuted solids of uniform moisture content.

5. The method of sewage disposal comprising concentrating the solids of the sewage to such consistency that the resulting sludge comprises not less than 40% of solids, introducing the resulting sludge to the influence of centrifugal force and releasing it therefrom and thereby dispersing the sludge in fine particles, and contacting the dispersed particles with heated gas, thereby drying the sludge and converting the same into substantially dry comminuted solids of uniform moisture content.

6. The method of dehydrating sewage sludge which comprises concentrating the sewage to at least 10% solids, dehydrating the concentrate to not more than 80% or less than 60% solids, spraying the concentrate in a stream of hot gases and controlling the water content in the residue by controlling the temperature of gases leaving the drying zone, thereby converting said concentrate into comminuted solids of uniform moisture content.

7. The method of sewage disposal which comprises concentrating sewage to form sludge, subjecting the resulting sludge to the influence of centrifugal force and releasing it therefrom, thereby dispersing the solids and liquid of the sludge into fine particles and contacting heated gas with the finely divided particles resulting from the dispersing operation, thereby converting the sludge into substantially dry comminuted solids or uniform moisture content.

CHAMPLAIN L. RILEY.

CERTIFICATE OF CORRECTION.

Patent No. 1,949,181.          February 27, 1934.

CHAMPLAIN L. RILEY.

It is hereby certified that error appears in the printed specification of the above numbered patent requiring correction as follows: Page 3, line 81, claim 5, for "40%" read 10%; and that the said Letters Patent should be read with this correction therein that the same may conform to the record of the case in the Patent Office.

Signed and sealed this 20th day of March, A. D. 1934.

F. M. Hopkins (Seal)          Acting Commissioner of Patents.

concentrate contains large solids and the sludge before spray drying is reduced to a paste by means of a ball mill or other suitable means.

I claim:

1. The method of sewage disposal which comprises concentrating the sewage to form sludge and centrifugally atomizing the sludge in a current of hot gases, thereby converting the sludge into substantially dry comminuted solids of uniform moisture content.

2. The method of sewage disposal which comprises removing large solids by straining, concentrating the strained sewage to form sludge, reducing the solids to a paste and adding the same to the sludge and centrifugally atomizing the sludge in a current of hot gases, thereby converting the sludge into substantially dry comminuted solids of uniform moisture content.

3. The method of sewage disposal comprising rapidly concentrating the solids in the sewage at such rate as to avoid substantial bacterial action, and centrifugally spraying the resulting sludge in contact with heated gas, thereby converting said sludge into substantially dry comminuted solids of uniform moisture content.

4. The method of sewage disposal comprising rapidly concentrating the solids in the sewage at such rate as to avoid substantial bacterial action, introducing the resulting sludge promptly to the influence of centrifugal force and releasing it therefrom and thereby dispersing the solids and liquid of the sludge into fine particles, and contacting heated gas with the finely divided particles resulting from the dispersing operation and thereby converting the sludge into substantially dry comminuted solids of uniform moisture content.

5. The method of sewage disposal comprising concentrating the solids of the sewage to such consistency that the resulting sludge comprises not less than 40% of solids, introducing the resulting sludge to the influence of centrifugal force and releasing it therefrom and thereby dispersing the sludge in fine particles, and contacting the dispersed particles with heated gas, thereby drying the sludge and converting the same into substantially dry comminuted solids of uniform moisture content.

6. The method of dehydrating sewage sludge which comprises concentrating the sewage to at least 10% solids, dehydrating the concentrate to not more than 80% or less than 60% solids, spraying the concentrate in a stream of hot gases and controlling the water content in the residue by controlling the temperature of gases leaving the drying zone, thereby converting said concentrate into comminuted solids of uniform moisture content.

7. The method of sewage disposal which comprises concentrating sewage to form sludge, subjecting the resulting sludge to the influence of centrifugal force and releasing it therefrom, thereby dispersing the solids and liquid of the sludge into fine particles and contacting heated gas with the finely divided particles resulting from the dispersing operation, thereby converting the sludge into substantially dry comminuted solids or uniform moisture content.

CHAMPLAIN L. RILEY.

CERTIFICATE OF CORRECTION.

Patent No. 1,949,181.  February 27, 1934.

CHAMPLAIN L. RILEY.

It is hereby certified that error appears in the printed specification of the above numbered patent requiring correction as follows: Page 3, line 81, claim 5, for "40%" read 10%; and that the said Letters Patent should be read with this correction therein that the same may conform to the record of the case in the Patent Office.

Signed and sealed this 20th day of March, A. D. 1934.

F. M. Hopkins (Seal)  Acting Commissioner of Patents.